United States Patent
Lee et al.

(10) Patent No.: US 11,386,398 B2
(45) Date of Patent: Jul. 12, 2022

(54) ELECTRONIC MEETING ANALYSIS FOR AUTOMATIC CONFERENCE ROOM ASSIGNMENT

(71) Applicant: Microsoft Technology Licensing, LLC, Redmond, WA (US)

(72) Inventors: Charles Yin-Che Lee, Mercer Island, WA (US); Warren David Johnson, III, Sammamish, WA (US); Pamela Bhattacharya, Redmond, WA (US); Suri Raman, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 176 days.

(21) Appl. No.: 16/750,779

(22) Filed: Jan. 23, 2020

(65) Prior Publication Data

US 2021/0233035 A1 Jul. 29, 2021

(51) Int. Cl.
*G06Q 10/10* (2012.01)
*G06F 16/9537* (2019.01)
(Continued)

(52) U.S. Cl.
CPC ..... *G06Q 10/1095* (2013.01); *G06F 16/9537* (2019.01); *G06Q 10/02* (2013.01); *G06Q 10/06312* (2013.01)

(58) Field of Classification Search
CPC ............... G06Q 10/1095; G06Q 10/02; G06Q 10/06312; G06F 16/9537
(Continued)

(56) References Cited

U.S. PATENT DOCUMENTS

| 6,781,920 B2 * | 8/2004 | Bates .................. G06Q 10/109 368/41 |
| 9,721,233 B2 * | 8/2017 | Norton ............... G06Q 10/1093 |

(Continued)

FOREIGN PATENT DOCUMENTS

WO   WO-2017184468 A1 * 10/2017 ......... G06Q 10/1095

OTHER PUBLICATIONS

Wilson, Mark. "If you CC this robot, it will schedule meetings for you" https://www.fastcompany.com/3051464/if-you-cc-this-robot-onto-your-emails-it-will-schedule-meetings-for-you Published Sep. 24, 2015. (Year: 2015).*

(Continued)

*Primary Examiner* — George Chen
*Assistant Examiner* — Lisa Ma

(57) ABSTRACT

In non-limiting examples of the present disclosure, systems, methods and devices for assigning conference rooms are presented. A meeting request may be received by an electronic meeting service. Meeting fit scores may be calculated for the meeting request and one or more conference rooms. The meeting fit scores may be based on location, capacity, and/or audio-visual capabilities. The meeting request may be assigned to a conference room with a highest meeting fit score. A meeting request may be re-assigned to a different conference room based on a conference room becoming available that has a higher meeting fit score. A meeting request may be re-assigned to a different conference room based on characteristics of the meeting request being modified (e.g., fewer invitees, more invitees, different location specified), and thus, the meeting fit scores for conference rooms changing based on those modifications.

20 Claims, 11 Drawing Sheets

(51) Int. Cl.
*G06Q 10/02* (2012.01)
*G06Q 10/06* (2012.01)

(58) Field of Classification Search
USPC .............................................................. 705/5
See application file for complete search history.

(56) References Cited

U.S. PATENT DOCUMENTS

| | | |
|---|---|---|
| 9,727,846 B2* | 8/2017 | Hapse ................ G06Q 10/1095 |
| 2005/0071213 A1* | 3/2005 | Kumhyr ............. G06Q 10/0631 |
| | | 705/7.12 |
| 2017/0147950 A1* | 5/2017 | Carbonell .............. G06Q 10/02 |
| 2018/0123997 A1* | 5/2018 | Celedonia ............... H04L 67/34 |
| 2018/0174112 A1* | 6/2018 | Breedvelt-Schouten .................... |
| | | G06Q 10/1095 |
| 2019/0295020 A1 | 9/2019 | Gupta et al. |

OTHER PUBLICATIONS

"International Search Report and Written Opinion Issued in PCT Application No. PCT/US20/065179", dated Mar. 12, 2021, 10 pages.

* cited by examiner

ELECTRONIC MEETING ANALYSIS FOR AUTOMATIC CONFERENCE ROOM ASSIGNMENT

BACKGROUND

Electronic calendars have become ubiquitous in everyday work and home life. Users are able to coordinate their own schedules using electronic calendars, and with internet connectivity, they are able to interact with other users' calendars via the sending and receiving of electronic calendar event invitations. Although electronic calendars and electronic meeting invites have made booking meetings much more efficient, identifying conference rooms that fit the needs of a meeting can be challenging. Part of this challenge arises from users booking conference rooms that have more capacity than a meeting requires and/or that have features that are not needed.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assigning meeting requests to conference rooms. An electronic meeting service may receive meeting requests. Those meeting requests may be included in electronic messages (e.g., email, digital assistant command, etc.) or received via an event scheduling interface. The electronic meeting service may calculate meeting fit scores between a received meeting request and one or more conference rooms. The meeting fit scores may be based on conference room location, user location preferences, conference room capacity, potential meeting attendee number, and/or electronic meeting options, for example. The electronic meeting service may assign a meeting request to a conference room that has a highest meeting fit score.

A meeting request may be assigned to a different conference room if a better fit becomes available. For example, if a meeting request was originally booked to a first conference room but a second conference room that was booked for the meeting time had a better meeting fit score for that request, and that second conference room later became available (e.g., due to cancellation, do to it being moved to a different conference room), the meeting request may be reassigned to the second conference room. A meeting request may be assigned to a different conference room if the meeting request changes/is updated. For example, if invitees are added or removed from a meeting request, a different conference room with a different capacity characteristic may be a better fit (e.g., higher meeting fit score) and the meeting request may subsequently be reassigned. A meeting request may also be assigned to a different conference room if a user's locational preferences change.

BRIEF DESCRIPTION OF THE DRAWINGS

Non-limiting and non-exhaustive examples are described with reference to the following figures.

DETAILED DESCRIPTION

Figure 1:
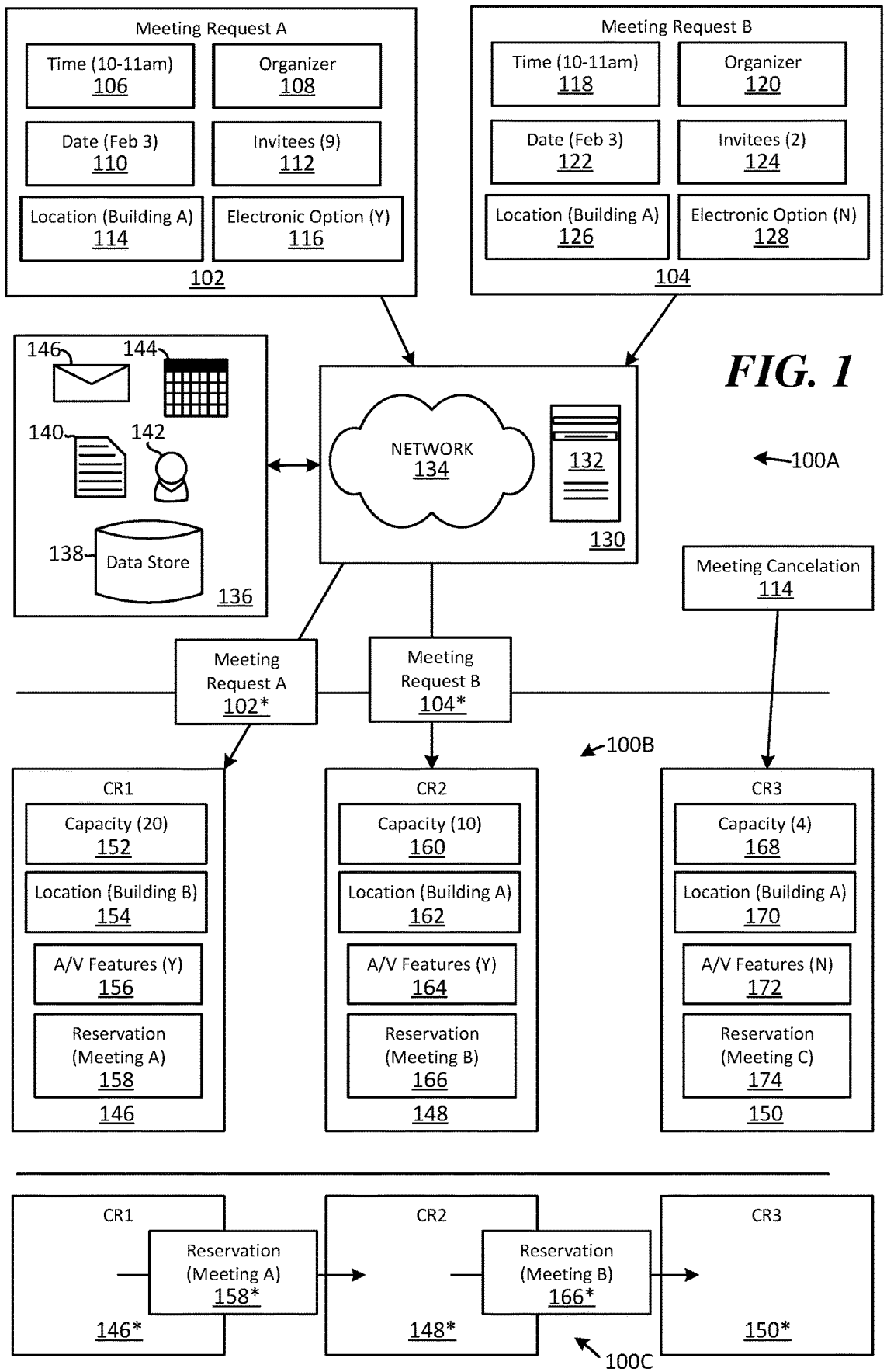
FIG. 1 is a schematic diagram illustrating an example distributed computing environment for assigning conference rooms.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for assigning meeting requests to conference rooms. An electronic meeting service may receive meeting requests. The electronic meeting service may receive explicit meeting requests or implicit meeting requests. An explicit meeting request may be sent to the electronic meeting service via a specific meeting button and/or "book meeting" tool in an associated application or website. Alternatively, an implicit meeting request may be sent to the electronic meeting service via a natural language request in a message (e.g., in an email, in an SMS message, in an input to a digital assistant). For example, an email may be received by the electronic meeting service based on a digital assistant and/or email address associated with the electronic meeting service being included in the email (e.g., in the "to" field, in the "cc" field, included in the body), the email may include natural language that comprises a "schedule meeting" intent, that schedule meeting intent may be identified via one or more natural language processing models, and entities associated with that schedule meeting intent may be identified and extracted for use in scheduling a corresponding meeting. The extracted entities may comprise one or more of: meeting organizer identity, meeting invitee identities, meeting location, whether there is an electronic meeting option/request, time of meeting, and duration of meeting, for example.

The electronic meeting service may analyze the extracted entities from a meeting request and meeting preferences associated with the meeting organizer and/or one or more potential meeting attendees and calculate meeting fit scores for one or more conference rooms. The meeting preferences may include location preferences for scheduling meetings and/or conference room preferences for scheduling meetings. For example, an organizing user may be associated with one or more location preferences (e.g., buildings, wings of buildings, floors of buildings) where the user prefers to have meetings, and/or one or more specific conference room preferences where the user prefers to have meetings. Those preferences may be stored in a user database associated with the electronic meeting service.

In calculating a meeting fit score between a meeting request and a conference room, the electronic meeting service may determine a location match value for a scheduling user that sent the meeting request. The location match value may correspond to a geographic proximity between a location preference or conference room preference of the scheduling user and the conference room. For example, the closer the conference room is to a locational preference or conference room preference, the higher the location match value. In calculating a meeting fit score between a meeting request and a conference room, the electronic meeting service may also determine a capacity match value between the conference room and a number of potential meeting attendees (e.g., number of invitees plus meeting organizer). An exact match between the number of potential meeting attendees and the conference room's capacity may have a highest score, while the score may be lower if the conference room does not have enough capacity to handle the number of potential meeting attendees. The capacity match value may also be lower for conference rooms that have capacity over the number of potential meeting attendees. In calculating a meeting fit score between a meeting request and a conference room, the electronic meeting service may determine an audio-visual match value for the conference room. That is, if a determination is made that the meeting request includes a request for an electronic meeting (in addition to an in-person meeting), a conference room with audio-visual equipment built into it may have a higher audio-visual match value than a conference room that does not have audio-visual equipment built into it. One or more of these values may be utilized in arriving at a meeting fit score for a conference room. If two or more of these values are utilized in calculating a meeting fit score for a conference room, the values may or may not be weighted. For example, a first weight may be applied to the location match value for a conference room, a second weight may be applied to the capacity match value for the conference room, and a third weight may be applied to the audio-visual match value for the conference room.

The electronic meeting service may assign a meeting request to a conference room for which a highest meeting fit score has been calculated. For example, if a meeting fit score of 85/100 has been calculated for conference room A and a meeting request, and a second meeting fit score of 95/100 has been calculated for conference room B and that same meeting request, the electronic meeting service may assign the meeting request to conference room B. The electronic meeting service may periodically, or when specifically requested (e.g., via manual request, based on an update to a meeting request), determine whether an already assigned meeting request can be moved to a conference room with a higher meeting fit score. That is, meetings may be moved to different conference rooms and/or canceled, and thus previously unavailable conference rooms may be utilized by meeting requests that were originally assigned to other conference rooms. Additionally, if updates are made to a meeting request (e.g., invitees added, invitees removed, invitees declined, invitees accepted, location changed, electronic meeting option changed, etc.), meeting fit scores may be recalculated and the meeting request may be potentially assigned to a different conference room that has a higher meeting fit score based on the modified information. A user's locational preferences may also be changed, which may affect meeting fit scores for conference rooms. For example, a user may manually change her locational preferences and meeting fit scores for meetings may thus be affected. In other examples, a user's locational preferences may be dynamically modified based on the electronic meeting service determining that a user is likely to be at a location that does not correspond to the user's locational preferences. That determination may be made based on analyzing one or more calendar events and their corresponding locations.

According to some examples, because the electronic meeting service may process and schedule meetings for meeting requests that include flexible time constraints (e.g., "tomorrow afternoon" rather than 1-2 pm; "sometime next week" rather than Monday from 9-10 am), the electronic meeting service may initially assign a meeting request to a first time and/or date and first conference room, and subsequently assign that meeting request to a different time and/or date and different conference room. For example, if a first meeting request states: "[digital assistant] book us a meeting for sometime next week", and a first conference room has a highest meeting fit score (e.g., 70/100) for that meeting request on Monday from 9-10 am, the meeting request may initially be assigned to the first conference room. However, if a different conference room with a higher meeting fit score (e.g., 95/100) that was previously booked during that entire next week opens on Tuesday from 10-11 am, the electronic meeting service may move the meeting request to the second conference room for Tuesday from 10-11 am.

The systems, methods, and devices described herein provide technical advantages for assigning meeting requests to conference rooms. Processing costs (e.g., CPU cycles) associated with identifying conference rooms that are a good fit for meetings are reduced in that users do not have to perform manual searches of those conference rooms on an individual basis. Rather, an electronic meeting service may maintain a database of conference rooms and corresponding conference room characteristics (e.g., size, capacity, A/V equipment, location) and automatically match those conference rooms to meeting requests. The user experience associated with booking conference rooms and attending meetings in those conference rooms is also improved in that meeting requests are automatically assigned, and in some cases re-assigned, to conference rooms that fulfill the requirements of those requests the best. Thus, conference room availability and capacity are utilized in the most efficient manner via the mechanisms described herein.

FIG. 1 is a schematic diagram illustrating an example distributed computing environment for assigning conference rooms. The computing environment is divided into three subsets: first computing environment subset 100A, which includes meeting request sub-environment A 102, meeting request sub-environment B 104, network and processing sub-environment 130, data store sub-environment 136; second computing environment subset 100B, which includes first conference room 146, second conference room 148, and third conference room 150; and third computing environment subset 100C, which includes modified first conference room 146*, modified second conference room 148*, and modified third conference room 150*.

Network and processing sub-environment 130 includes network 134 and server computing device 132. Any and all of the computing devices described herein may communicate with one another via a network such as network 134. Server computing device 132 is illustrative of one or more computing devices that may host an electronic meeting service. The electronic meeting service may be associated and/or incorporated in an electronic calendar service and/or an email service. In examples, the electronic meeting service may analyze one or more meeting requests and book meetings, and locations for those meetings, based on those requests. The electronic meeting service may receive explicit meeting requests or implicit meeting requests. An explicit meeting request may be sent to the electronic meeting service via a specific meeting button and/or "book meeting" tool in an associated application or website. Alternatively, an implicit meeting request may be sent to the electronic meeting service via a natural language request in a message (e.g., in an email, in an SMS message, in an input to a digital assistant). For example, an email may be received by the electronic meeting service based on a digital assistant and/or email address associated with the electronic meeting service being included in the email (e.g., in the "to" field, in the "cc" field, included in the body), the email may include natural language that comprises a "schedule meeting" intent, that schedule meeting intent may be identified via one or more natural language processing models, and entities associated with that schedule meeting intent may be identified and extracted for use in scheduling a corresponding meeting.

Meeting request sub-environment A 102 includes a plurality of elements that have been extracted from and/or identified in association with a first meeting request (e.g., meeting request A). Those elements are meeting time/duration element 106, meeting organizer element 108, meeting date element 110, meeting invitee element 112, meeting location element 114, and electronic option element 116. Time/duration element 106 comprises a start time and an end time for the meeting corresponding to meeting request A. The start time is 10 am and the end time is 11 am. Meeting organizer element 108 comprises an identity of a user and/or user account that sent meeting request A. Date element 110 comprises a date on which the meeting is to occur. That date is February 3. Invitees element 112 comprises a plurality of identities for users and/or user accounts that are to be invited to the meeting. Invitee element 112 includes the identities of nine invitees. Location element 114 comprises a location where the meeting is to be scheduled/booked. That location is "building A". Electronic option element 116 comprises an indication of whether the meeting should include an option to join the meeting electronically. Electronic option element 116 does include an option for joining the meeting electronically.

Meeting request sub-environment B 104 includes a plurality of elements that have been extracted from and/or identified in association with a second meeting request (e.g., meeting request B). Those elements are meeting time/duration element 118, meeting organizer element 120, meeting date element 122, meeting invitee element 124, meeting location element 126, and electronic option element 128. Time/duration element 118 comprises a start time and an end time for the meeting corresponding to meeting request B. The start time is 10 am and the end time is 11 am. Meeting organizer element 120 comprises an identity of a user and/or user account that sent meeting request B Date element 122 comprises a date on which the meeting is to occur. That date is February 3. Invitee element 124 comprises a plurality of identities for users and/or user accounts that are to be invited to the meeting. Invitee element 124 includes the identities of two invitees. Location element 126 comprises a location where the meeting is to be scheduled/booked. That location is "building A". Electronic option element 128 comprises an indication of whether the meeting should include an option to join the meeting electronically. Electronic option element 128 does not include an option for joining the meeting electronically.

Each of the elements described above may have been identified and/or extracted by the electronic meeting service. The identification of those elements may have been via analysis of an explicit meeting request or an implicit meeting request as described above.

Data store sub-environment 136 includes data store 138, which may include information associated with a plurality of users, such as user data 142, electronic documents 140, electronic messages 146, and calendar data 144. User data 142 may include user identities (e.g., alias for user, account sign-in information, password verification information, etc.), electronic documents 140 may include one or more documents associated with one or more applications and/or services related to user data 142. Electronic messages 146 may include electronic messages and/or metadata associated with those electronic messages, that are associated with one or more applications and/or services related to user data 142. Calendar data 144 may include electronic calendar requests/invites, scheduled calendar events, contacts, and other data and metadata associated with the electronic meeting service and/or one or more electronic calendar applications that are related to user data 142.

When a meeting request is received, the electronic meeting service may identify a user account associated with the organizer of that meeting request. In some examples, the electronic meeting service may identify one or more user accounts associated with the invitees of the meeting request. The electronic meeting service may then identify meeting location preferences associated with those users. For example, data store 138 may include locational preferences for the organizer and/or invitees associated with meeting request A. Locational preferences for a user may include one or more preferred buildings for meetings, one or more areas (e.g., east, west, north, south, first floor, second floor) of a building that are preferred for meetings, and/or one or more specific conference rooms that are preferred for meetings, for example. The locational preferences may be manually associated with a user account or they may be automatically associated with a user account. For example, if a user is determined to be primarily located in a specific building and/or a specific room (or other sub-set of a building) in a specific building, closest conference rooms to those locations may be automatically associated with the user account as locational preferences. In some examples a user may navigate to preferences associated with the electronic meeting service and modify locational preferences for meetings.

Moving to second computing environment subset 100B, each of the conference rooms (e.g., conference room one 146, conference room two 148, conference room three 150) illustrate both physical and electronic entities corresponding to conference rooms. That is, each of the illustrated conference rooms represents an actual physical conference room at a geographic location, and each of those illustrated conference rooms may be represented in a conference room database associated with the electronic meeting service. For example, each of conference room one 146, conference room two 148, and conference room three 150, may be included in a conference room database and associated with their corresponding characteristics (e.g., capacity, location, A/V features, reservations).

In this example, conference room one 146 includes capacity characteristic 152, location characteristic 154, A/V features characteristic 156, and reservation characteristic 158. Capacity characteristic 152 indicates that the attendee capacity for conference room one 146 is twenty people. Location characteristic 154 indicates that the geographic location of conference room one 146 is in building B. Additional information regarding a conference room's geographic location may be included as a location characteristic. For example, a conference room's floor in a building may be indicated, and/or a conference room's specific location (e.g., north wing, south wing, east wing, west wing) in a building may be indicated. A/V features characteristic 156 indicates that conference room one 146 has audio/visual technology incorporated in it so that users may join and participate in a meeting electronically utilizing those components. Reservation characteristic 158 indicates that conference room one 146 has been reserved for meeting A, corresponding to meeting request A 102* in this example, for February 3 from 10-11 am. Reservation characteristic 158 may also include any other reservations that are currently scheduled and/or that have been sent for conference room one 146.

Conference room two 148 includes capacity characteristic 160, location characteristic 162, A/V feature characteristic 164, and reservation characteristic 166. Capacity characteristic 160 indicates that the attendee capacity for conference room two 148 is ten people. Location characteristic 162 indicates that the geographic location of conference room two 148 is in building A. A/V features characteristic 164 indicates that conference room two 148 has audio/visual technology incorporated in it so that users may join and participate in a meeting electronically utilizing those components. Reservation characteristic 166 indicates that conference room two 148 has been reserved for meeting B, corresponding to meeting request B 104* in this example, for February 3 from 10-11 am. Reservation characteristic 166 may also include any other reservations that are currently scheduled and/or that have been sent for conference room two 148.

Conference room three 150 includes capacity characteristic 168, location characteristic 170, A/V features characteristic 172, and reservation characteristic 174. Capacity characteristic 168 indicates that the attendee capacity for conference room three 150 is four people. Location characteristic 170 indicates that the geographic location of conference room three 150. A/V features characteristic 172 indicates that conference room three 150 does not have audio/visual technology incorporated in it. Reservation characteristic 174 indicates that conference room three 150 has been reserved for meeting C on February 3 from 10-11 am. A meeting request corresponding to meeting C may have been previously received by the electronic meeting service, although that meeting request is not illustrated in FIG. 1. Reservation characteristic 174 may also include any other reservations that are currently scheduled and/or that have been sent for conference room three 150.

The electronic meeting service may determine meeting fit scores for each meeting request and one or more conference rooms for holding those meetings/meeting requests. For example, a first meeting fit score for meeting request A 102* may be determined for conference room one 146, a second meeting fit score for meeting request A 102* may be determined for conference room two 148, and a third meeting fit score for meeting request A 102* may be determined for conference room three 150. In examples, meeting fit scores may be calculated for each meeting request and one or more conference rooms that are included as preferred conference rooms in a user's preferences (e.g., in data store 138). In additional examples, meeting fit scores may be calculated for a meeting request and one or more conference rooms that are not in a user's preferences, but that are in a location that is proximate to (e.g., same building, same floor of building, same wing of building, same area of campus) one or more meetings for an organizing or invitee user on the same day as the meeting request. The conference room fit and scoring mechanisms related to conference room fit are described in more detail below in relation to FIG. 3.

Conference room three 150 was the first of the three conference rooms to have been booked, conference room two was the second of the three conference rooms to have been booked, and conference room one was the third of the three conference rooms to have booked (all for the February 3 from 10-11 am timeslot). Conference room three 150 would have been a better fit (corresponding to a higher meeting fit score) for meeting request B 104* because there would be less waste of capacity booking conference room three 150 than for conference room two 148, and because A/V features would not be wasted due to electronic option element 128 indicating that no electronic meeting option is needed for meeting request B*. However, because conference room three 150 was already booked when meeting request B 104* was received, the next best conference room fit (second highest meeting fit score) was identified and reserved for conference room two 148.

Conference room two 148 would have been a better fit (corresponding to a higher meeting fit score) for meeting request A 102* because there would have been less waste of capacity booking conference room two 148 than for conference room one 146. That is, meeting request A 102* included ten potential attendees (nine invitees and one organizer), but meeting request A 102* was originally added to a reservation for conference room one 146 with a capacity of twenty people, rather than to conference room 148 with a capacity of ten, which would have fulfilled all of the requirements of the request if it was not already reserved for meeting request B 104*.

After each of the three conference rooms were booked (meeting A in conference room one 146, meeting B in conference room two 148, meeting C in conference room three 150), the reservation for meeting C in conference room three 150 was canceled. This is illustrated by meeting cancelation 114.

Moving to third computing environment subset 100C, and based on meeting cancelation 114, the electronic meeting service may automatically move meeting reservations to increase the meeting fit score for one or more of those reservations. Third computing environment subset 100C includes conference room one 146*, conference room two 148* and conference room three 150*, which are the same conference rooms as illustrated in relation to second computing environment subset 100B, but after meeting cancelation 114 is received.

Because there is a higher meeting fit score for meeting reservation 166* for meeting B and conference room three 150* than for conference room two 148*, reservation 166* may be automatically moved to conference room three 150*. Similarly, because there is a higher meeting fit score for meeting reservation 158* and conference room 148* than for conference room one 146*, reservation 158* may be automatically moved to conference room two 148*.

According to examples, a meeting request/meeting reservation may only be automatically moved from a first conference room to a second conference room if the meeting fit score for the second conference room is higher than the meeting fit score for the first conference room. In other examples, a meeting request/meeting reservation may only be automatically moved from a first conference room to a second conference room if the meeting fit score for the second conference room is greater than a threshold value of the meeting fit score for the first conference room. In additional examples, where more than one conference room is to be moved, the electronic meeting service may cause a selectable option to be surfaced on a device associated with an organizer user of a meeting, and only upon affirmative selection of that option, cause a meeting request/meeting reservation to be moved.

Figure 2:
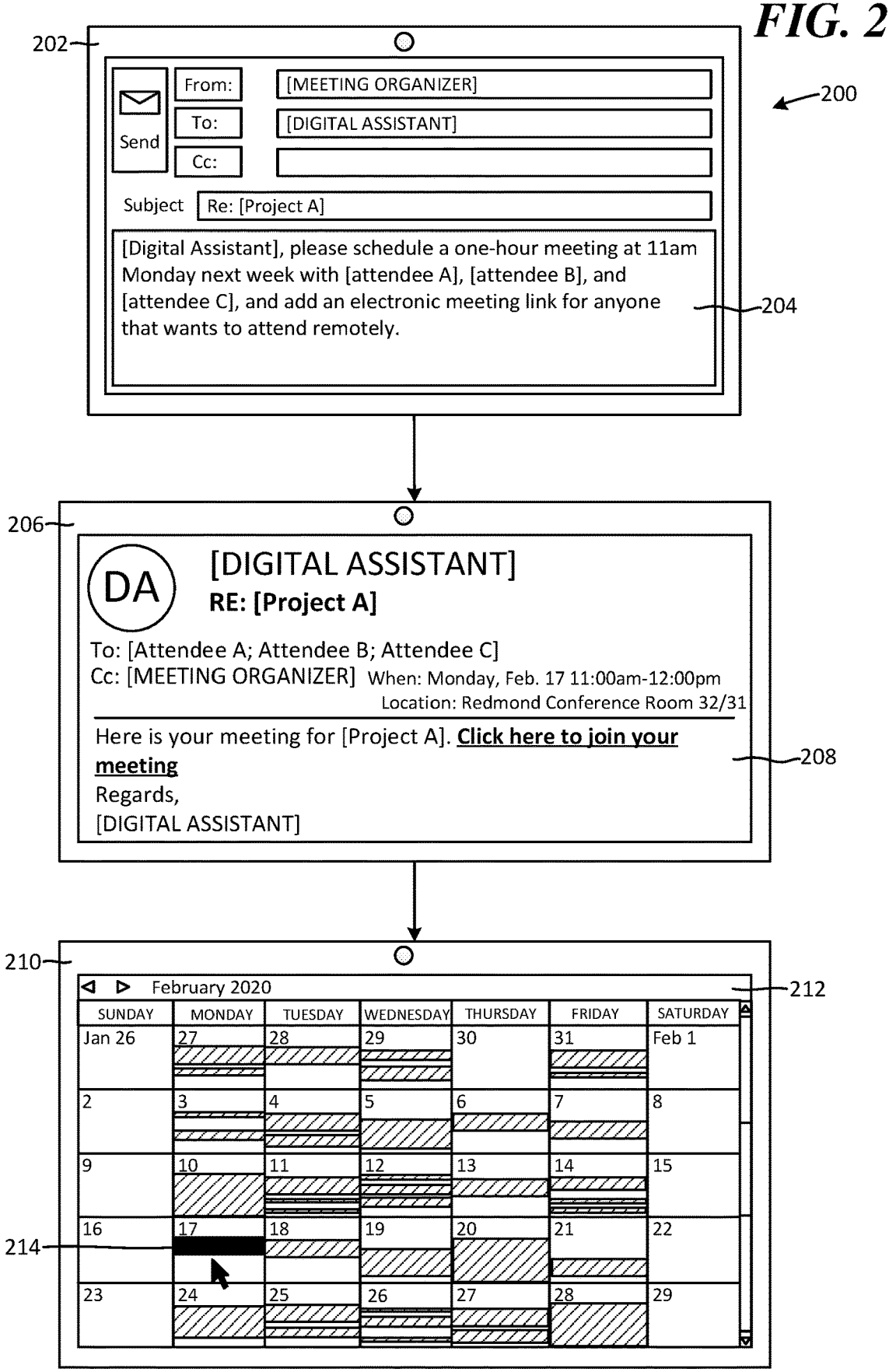
FIG. 2 illustrates three progressive user interfaces for scheduling and interacting with an electronic calendar event.

FIG. 2 illustrates three progressive user interfaces 200 for scheduling and interacting with an electronic calendar event. FIG. 2 includes computing device 202, computing device 206, and computing device 210. Those computing devices may be the same computing device or different computing devices.

Computing device 202 displays email 204 which is currently being drafted by [meeting organizer] to [digital assistant]. The digital assistant is included in the CC field, which may automatically cause email 204 to be routed to a digital assistant service and/or an electronic meeting service. Email 204 is illustrative of a meeting request that may be received by the electronic meeting service, analyzed, and a meeting automatically scheduled based on that analysis. Email 204 includes "[Project A]" in the "subject" field. The body of email 204 states: "[Digital Assistant], please schedule a one-hour meeting at 11 am Monday next week with [attendee A], [attendee B], and [attendee C], and add an electronic meeting link for anyone that wants to attend remotely.

The electronic meeting service may receive email 204 and apply one or more natural language processing models to it. The one or more natural language processing models may have been trained to identify whether there is a meeting intent associated with a natural language input and to identify relevant meeting entities (e.g., meeting time, meeting duration, meeting location, meeting invitees, meeting organizer, meeting requirements, etc.) from a natural language input. If an email is determined to include a meeting intent, the electronic meeting service may automatically book a meeting corresponding to that meeting intent. In examples where an email, and/or accessible data from one or more user accounts associated with an email, do does not include enough information to book a meeting, the electronic meeting service may send follow-up messages to the meeting organizer and/or one or more invitees to obtain that missing information so that a meeting can be scheduled.

Based on analyzing email 204, the electronic meeting service has scheduled a corresponding meeting. This is indicated by email 208, from [digital assistant] to [attendee A], [attendee B], [attendee C], and [meeting organizer] (in the "Cc" field), which is displayed on computing device 206. Email 208 states: "Here is your meeting for [Project A], Click here to join your meeting—Regards, [Digital Assistant]". Email 208 also indicates that the meeting is on Monday, February 17 from 11:00 am-12 pm, and that the location of the meeting is Redmond Conference Room 32/21.

Computing device 210 displays an electronic calendar 212 for the meeting organizer. The new meeting corresponding to email 204 and email 208 is indicated as being reserved by event user interface element 214 on electronic calendar 212. Additional information (e.g., time of meeting, duration of meeting, location of meeting, meeting invitees, number/identity of accepted invitees, number/identity of declined invitees, number/identity of tentative invitees) related to the meeting may be caused to be surfaced if user interface element 214 is interacted with (e.g., via mouse click, via touch input, via voice input).

Figure 3:
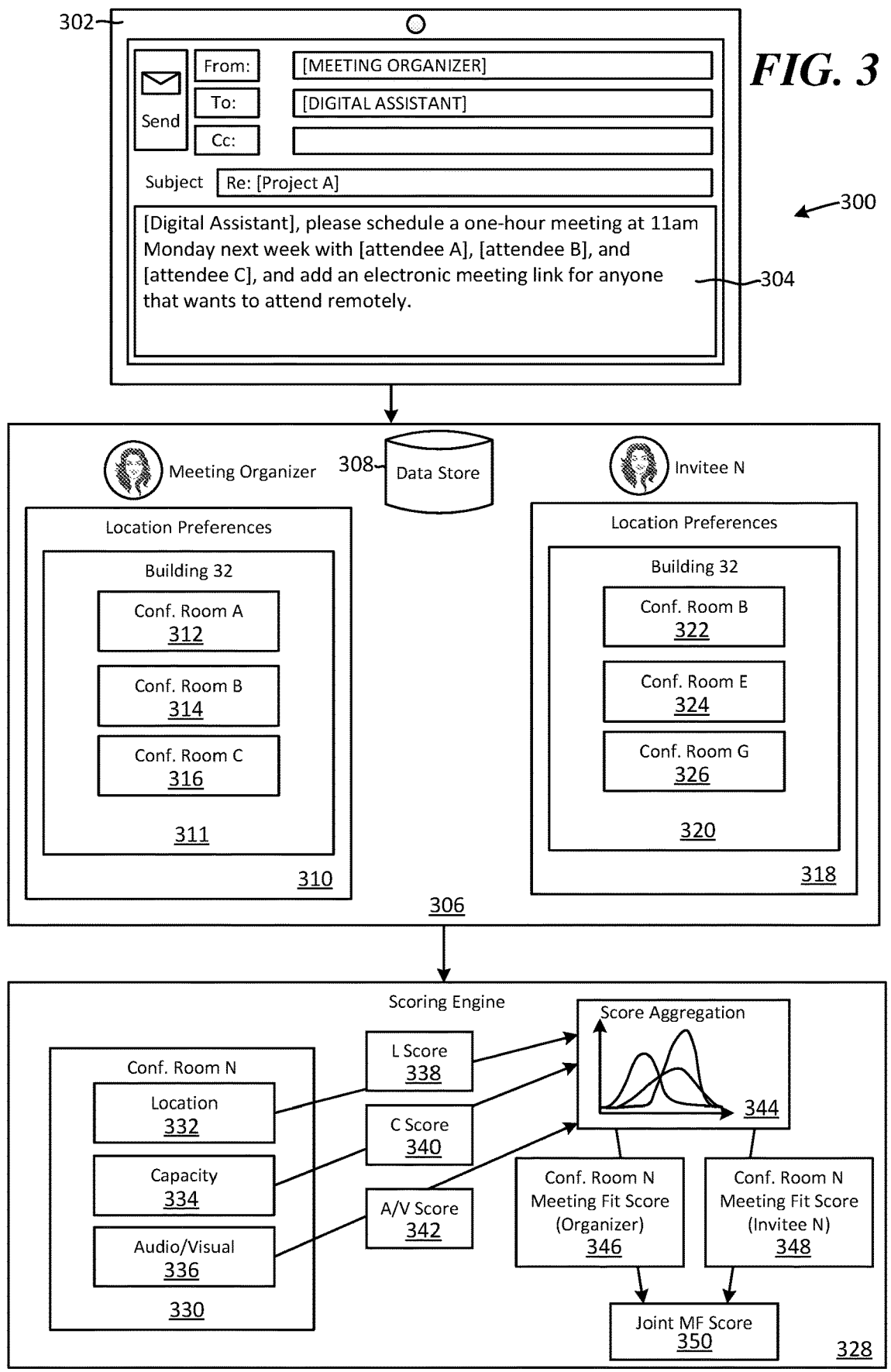
FIG. 3 is a schematic diagram illustrating an example distributed computing environment for calculating meeting fit scores for conference rooms.

FIG. 3 is a schematic diagram illustrating an example distributed computing environment 300 for calculating meeting fit scores for conference rooms. FIG. 3 includes computing device 302, data store sub-environment 306, and scoring engine sub-environment 328.

Computing device 302 displays email 304 which is currently being drafted by [meeting organizer] to [digital assistant]. The digital assistant is included in the CC field, which may automatically cause email 304 to be routed to a digital assistant service and/or an electronic meeting service. Email 304 is illustrative of a meeting request that may be received by the electronic meeting service, analyzed, and a meeting automatically scheduled based on that analysis. Email 304 includes "[Project A]" in the "subject" field. The body of email 304 states: "[Digital Assistant], please schedule a one-hour meeting at 11 am Monday next week with [attendee A], [attendee B], and [attendee C], and add an electronic meeting link for anyone that wants to attend remotely.

Data store sub-environment 306 includes data store 308, which comprises meeting/conference room preferences for users associated with the electronic meeting service. In this example, location preferences 310 correspond to location preferences for the meeting organizer (the meeting organizer associated with email 304), and location preferences 318 correspond to location preferences for one of the attendees (invitee N—corresponding to one of [attendee A], [attendee B], [attendee C]) included in email 304.

Location preferences 310 for the meeting organizer indicate that each of the conference rooms that are preferred meeting places for the meeting organizer are in building 32 311. Specifically, the meeting organizer has a highest preference for conference room A 312, a lower preference for conference room B 314, and an even lower preference for conference room C 316.

Location preferences 318 for invitee N indicate that each of the conference rooms that are preferred meeting places for that invitee are in building 32 318. Specifically, invitee N has a highest preference for conference room B 322, a lower preference for conference room E 324, and an even lower preference for conference room G 326.

More or fewer conference rooms and/or buildings with conference rooms in them may be included in a user's preferences in data store 308. Additionally, although each of the conference room preferences in this example have a relatively higher or lower preference value associated with them compared to each other conference room preference, a user may have two or more conference rooms with a same preference value associated with them.

Scoring engine sub-environment 328 includes characteristics for a conference room (conference room N 330). Conference room N represents one of conference room A 312, conference room B 314, conference room C 316, conference room B 322, conference room E 324, and conference room G 326. The characteristics for conference room N 330 are location characteristics 332, capacity characteristics 334, and audio/visual characteristics 336. In this example, a meeting fit score (conference room N meeting fit score [organizer] 346) for the meeting organizer is being calculated for the meeting request corresponding to email 304, and a meeting fit score (conference room N meeting fit score [invitee N] 348) for invitee N is being calculated for the meeting request corresponding to email 304. A further calculation is then applied to both values corresponding to those scores to arrive at joint meeting fit score 350, which corresponds to how well a conference room conforms to the meeting request and each of the meeting organizer's location preferences 310 and invitee N's location preferences 318.

In this example, the scoring engine generates location score 338, capacity score 340, and audio/visual score 342, for conference room N and each of the meeting organizer and invitee N. That is, a separate location score, capacity score, and audio/visual score may be generated for the organizer and invitee N (each of the invitees/attendees). Score aggregation element 344 aggregates the three scores for the meeting organizer into conference room N meeting fit score (organizer) 346. Score aggregation element 344 also aggregates the three scores for invitee N into conference room N meeting fit score (invitee N) 348. Finally, the scoring engine generates joint meeting fit score 350 based on a combination of and/or a compiled analysis of both of conference room N meeting fit score (organizer) 346 and conference room N meeting fit score (invitee N) 348.

Thus, in some examples, rather than simply determining which conference room to book for a meeting based on a meeting fit score for the organizer, the electronic meeting service may generate a joint meeting fit score that includes one or more meeting fit scores for a conference room and invitees of meeting request in addition to a meeting organizer. However, in some examples, only a meeting fit score for an organizer may be taken into account in determining which conference room to book.

Figure 4:
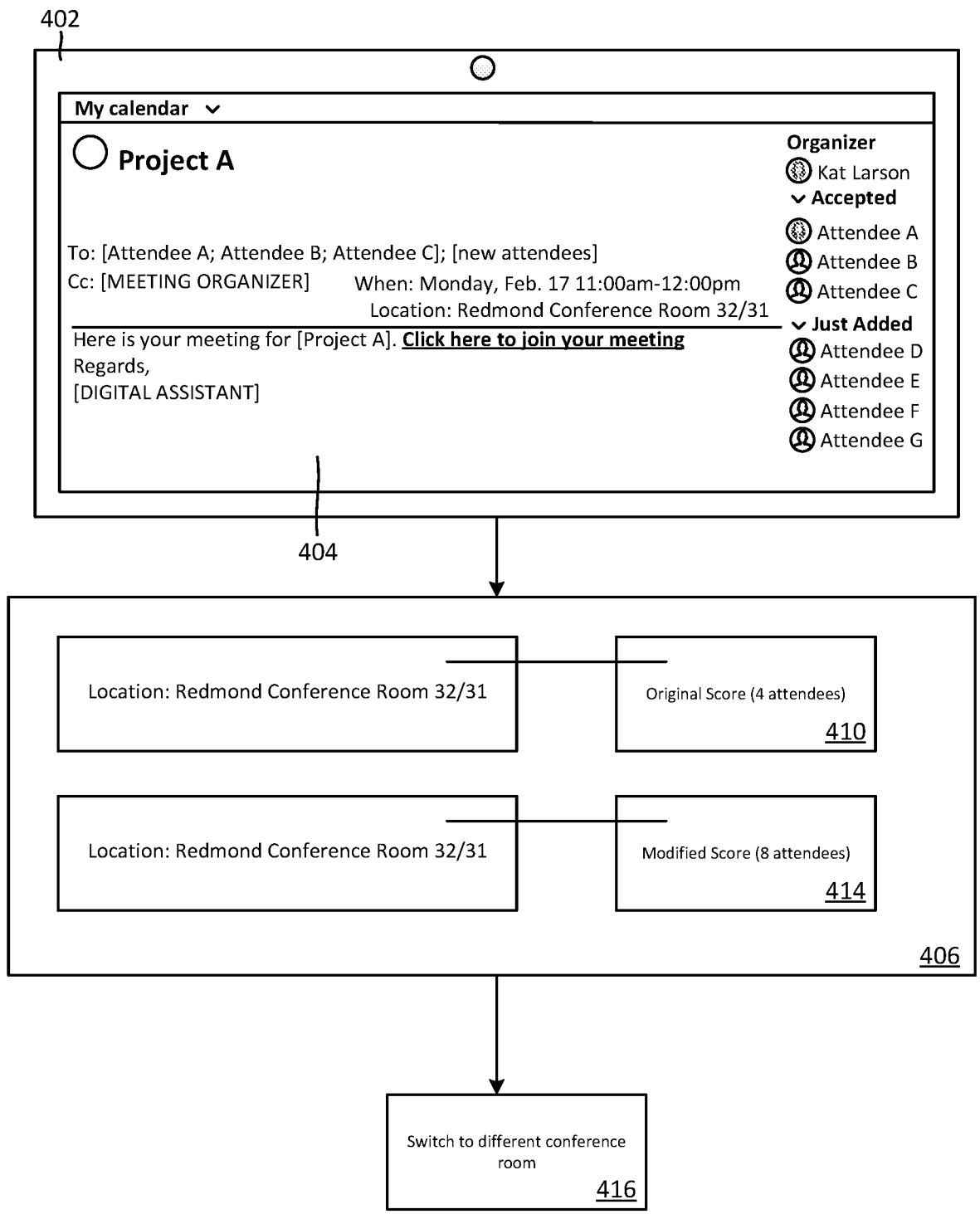
FIG. 4 illustrates the dynamic modification of a meeting fit score for a conference room based on modifications being made to a corresponding electronic meeting request.

FIG. 4 illustrates the dynamic modification of a meeting fit score for a conference room based on modifications being made to a corresponding electronic meeting request. FIG. 4 includes computing device 402, meeting fit score modification sub-environment 406, and conference room switch element 416.

Computing device 402 displays meeting information 404 associated with a meeting request. Meeting information 404 includes the meeting title/subject "Project A", the original invitees/attendees (Attendee A, Attendee B, Attendee C); newly-invited invitees [new attendees]; the meeting organizer, the date and time of the meeting (Monday, February 17, 11:00 am-12 pm); and the location (Redmond Conference Room 32/31). Meeting information 404 also identifies the attendees that have accepted the meeting request (Attendees A-C) and some attendees that were just invited to the meeting. The newly invited attendees are listed under the "Just Added" heading and comprise Attendee D, Attendee E, Attendee F, and Attendee G.

Meeting fit score sub-environment 406 includes original request score 410 for Redmond conference room 32/31 and the meeting request corresponding to meeting information 404. Meeting fit score sub-environment 406 also includes subsequent request score 414 for Redmond conference room 32/31 and the meeting request corresponding to meeting information 404. Original request score 410 is a score that was calculated for the meeting based on an original request that had four attendees, while subsequent request score 414 is a score that was calculated for the meeting based on the subsequent request that added four additional attendees (attendees D-G). Based on the modified score, the electronic meeting service may automatically switch the meeting corresponding to meeting information 404 to a new conference room with a higher meeting fit score, as illustrated by conference room switch element 416. For example, conference room 32/31 where the meeting was originally scheduled, may not have enough capacity to hold all the attendees with new attendees D through G being added to the request. As such, the meeting fit score for conference room 32/31 may be lower after the addition of the new attendees, a different conference room with higher capacity may then have a higher meeting fit score for the meeting request, and the meeting request may be moved to the new conference room.

Figure 5A:
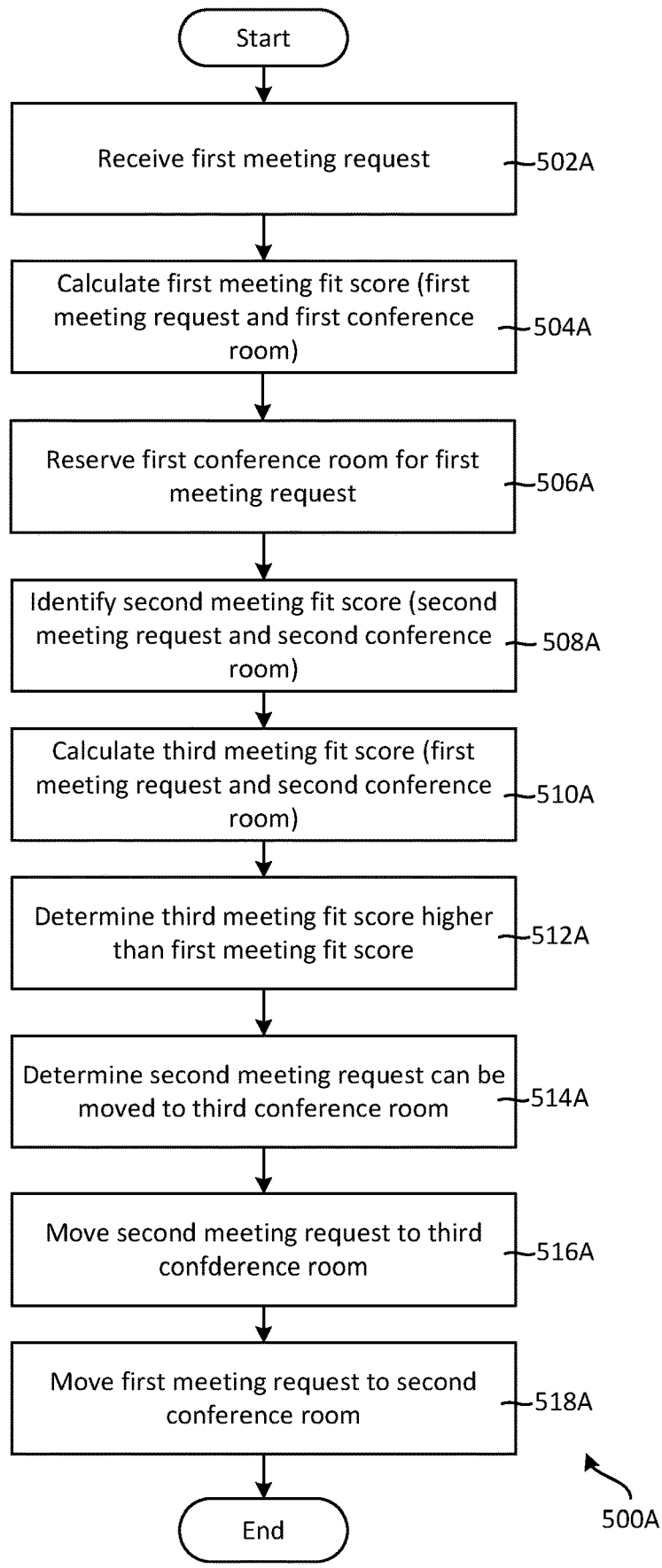
FIG. 5A is an exemplary method for assigning conference rooms.

FIG. 5A is an exemplary method for assigning conference rooms. The method 500A begins at a start operation and flow moves to operation 502A.

At operation 502A a first meeting request is received. The first meeting request may be received by an electronic meeting service. The electronic meeting service may be associated with a digital assistant service. In some examples, the first meeting request may be received as an explicit meeting request (e.g., via a schedule meeting interface, via a schedule meeting button). In other examples, the first meeting request may be received as an implicit meeting request (e.g., via a natural language request in an email, via a natural language request in a message to a digital assistant). The first meeting request may include one or more meeting elements. Those meeting elements may include identities of one or more invitees, whether the meeting should include an electronic attendance option, a location for having the meeting, a time for the meeting, and/or a duration for the meeting, for example.

From operation 502A flow continues to operation 504A where a first meeting fit score for a first conference room is calculated for the first meeting request. The meeting fit score may be calculated based on a location of the first conference room and one or more location preferences associated with the organizing user of the first meeting request. In additional examples, the first meeting fit score may be calculated based on capacity requirements of the first meeting request and capacity characteristics of the first conference room. In still additional examples, the first meeting fit score may be calculated based on audio/visual requirements included in the first meeting request and audio/visual characteristics of the first conference room. A combination of these characteristics may be utilized in calculating the first meeting fit score.

From operation 504A flow continues to operation 506A where the first conference room is reserved for the first meeting request. The reservation may be associated with the first conference room in a database of the electronic meeting service. The reservation may additionally be associated with a user account of the organizing user and one or more meeting invitees.

From operation 506A flow continues to operation 508A where a second meeting fit score for a second conference room is identified for a second meeting request, the second conference room reserved for the second meeting request. That is, the second conference room was previously booked for the second meeting request and a meeting fit score that was calculated for that conference room and the second meeting request is identified by the electronic meeting service.

From operation 508A flow continues to operation 510A where a third meeting fit score for the second conference room is calculated for the first meeting request. That is, one meeting fit score was calculated for the second conference room as discussed above at operation 508A, and another meeting fit score (the third meeting fit score) for that second conference room and the first meeting request is calculated here at operation 510A.

From operation 510A flow continues to operation 512A where a determination is made that the third meeting fit score is higher than the first meeting fit score.

From operation 512A flow continues to operation 514A where a determination is made that the second meeting request can be moved to a third conference room. The determination that the second meeting request can be moved to a third conference room may comprise calculating a meeting fit score for the second meeting request and the third conference room. The determination may further comprise determining that the newly calculated meeting fit score for the second meeting request and the third conference room is higher than and/or within a threshold value of the meeting fit score for the second meeting request and the second conference room. In additional examples, the determination may comprise receiving a confirmation from an organizing user associated with the second meeting request that the second meeting request can be moved to the third conference room.

From operation 514A flow continues to operation 516A where the second meeting request is moved to the third conference room.

From operation 516A flow continues to operation 518A where the first meeting request is moved to the second conference room.

From operation 518A flow moves to an end operation and the method 500A ends.

Figure 5B:
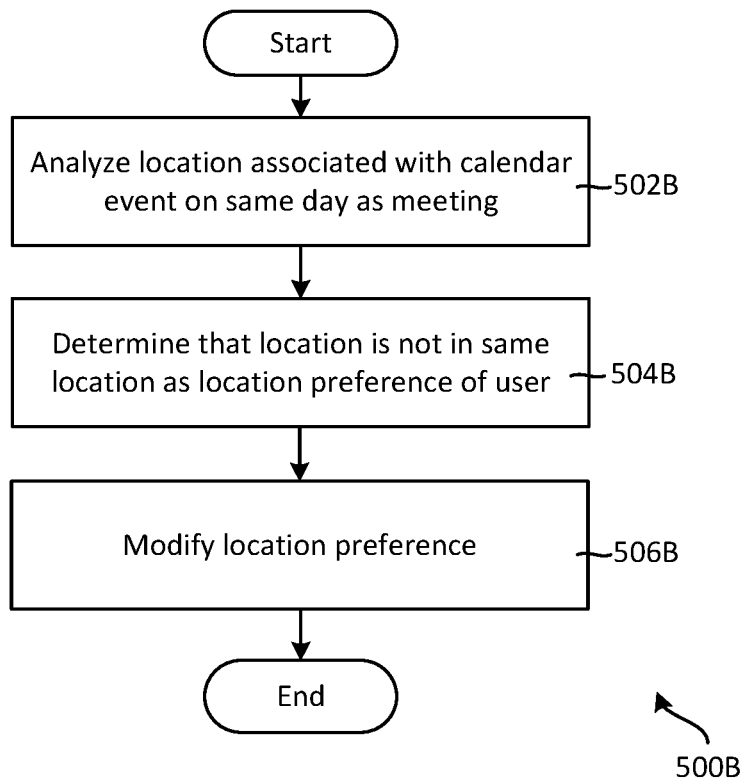
FIG. 5B is an exemplary method for dynamically modifying the assignment of a location preference for conference rooms.

FIG. 5B is an exemplary method 500B for dynamically modifying the assignment of a location preference for conference rooms. The method 500B begins at a start operation and flow moves to operation 502B.

At operation 502B a location associated with a calendar event that is scheduled for the same day as a meeting is analyzed. The electronic meeting service may analyze an electronic calendar associated with an organizer of a meeting. Specifically, the electronic meeting service may identify a first meeting the precedes a second meeting on the same day. In some examples, the second meeting may be in the process of being scheduled by an organizing user. In other examples, the second meeting may have already been scheduled. The first meeting may have a location associated with it on the electronic calendar. That location may be identified by the electronic meeting service.

From operation 502B flow continues to operation 504B where a determination is made that the location associated with the calendar event is not in a location corresponding to a location preference of a scheduling user. That is, the electronic meeting service may identify one or more location preferences associated with the scheduling/organizing user, and the location of the first meeting discussed in relation to operation 502B may not correspond to one of those location preferences.

From operation 504B flow continues to operation 506B where the location preference is dynamically modified to the location associated with the calendar event. For example, the scheduling/organizing user of the second meeting may be identified as likely being at the location corresponding to the first meeting prior to the second meeting. As such, the electronic meeting service may dynamically modify the user's location preferences so that conference rooms corresponding to the first meeting location will have higher meeting fit scores. Thus, the second meeting would be more likely to be booked, or moved to, one of the conference rooms in geographic proximity to the first meeting.

From operation 506B flow moves to an end operation and the method 500B ends.

Figure 5C:
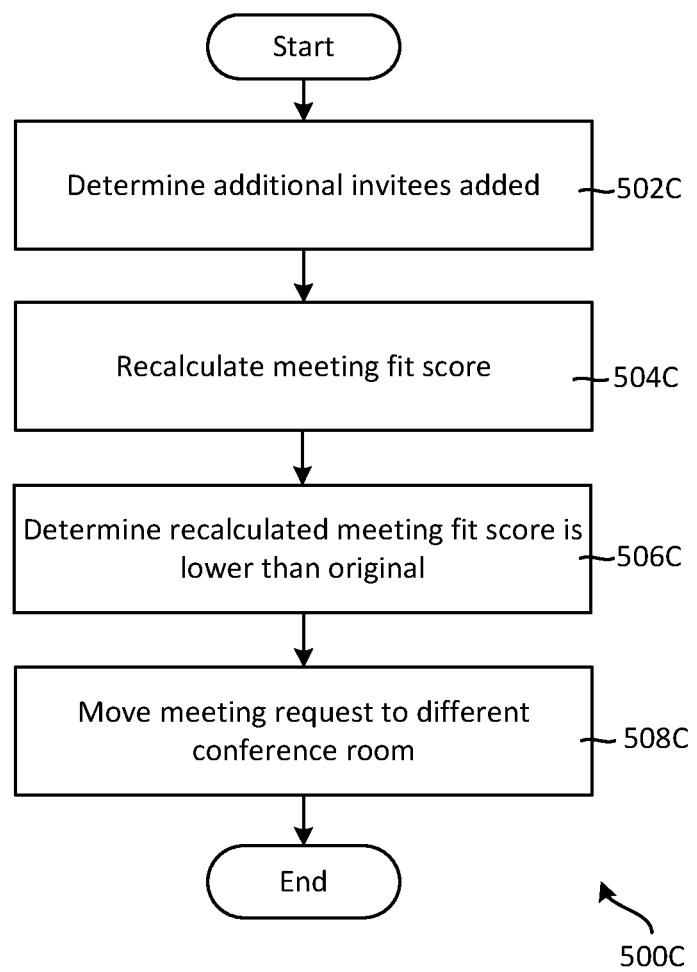
FIG. 5C is an exemplary method for dynamically modifying a conference room assignment based on changes being made to a number of invitees to a corresponding meeting request.

FIG. 5C is an exemplary method 500C for dynamically modifying a conference room assignment based on changes being made to a number of invitees to a corresponding meeting request. The method 500C begins at a start operation and flow moves to operation 502C.

At operation 502C a determination is made that additional invitees have been added to a first meeting request. The additional invitees may be added via an update to the first meeting request, a communication with a calendar assistant, and/or a communication with a digital assistant.

From operation 502C flow continues to operation 504C where a meeting fit score for a conference room and the first meeting request is recalculated. The recalculation may take into account the higher number of potential attendees and the capacity characteristics of one or more conference rooms.

From operation 504C flow continues to operation 506C where a determination is made that the recalculated meeting fit score is lower than the original calculation for the conference room. For example, the conference room may not have enough capacity to fit all the potential attendees based on the newly added invitees.

From operation 506C flow continues to operation 508C where the first meeting request is moved to a conference room for which there is a higher meeting fit score than the recalculated meeting fit score.

From operation 508C flow moves to an end operation and the method 500C ends.

Figure 6:
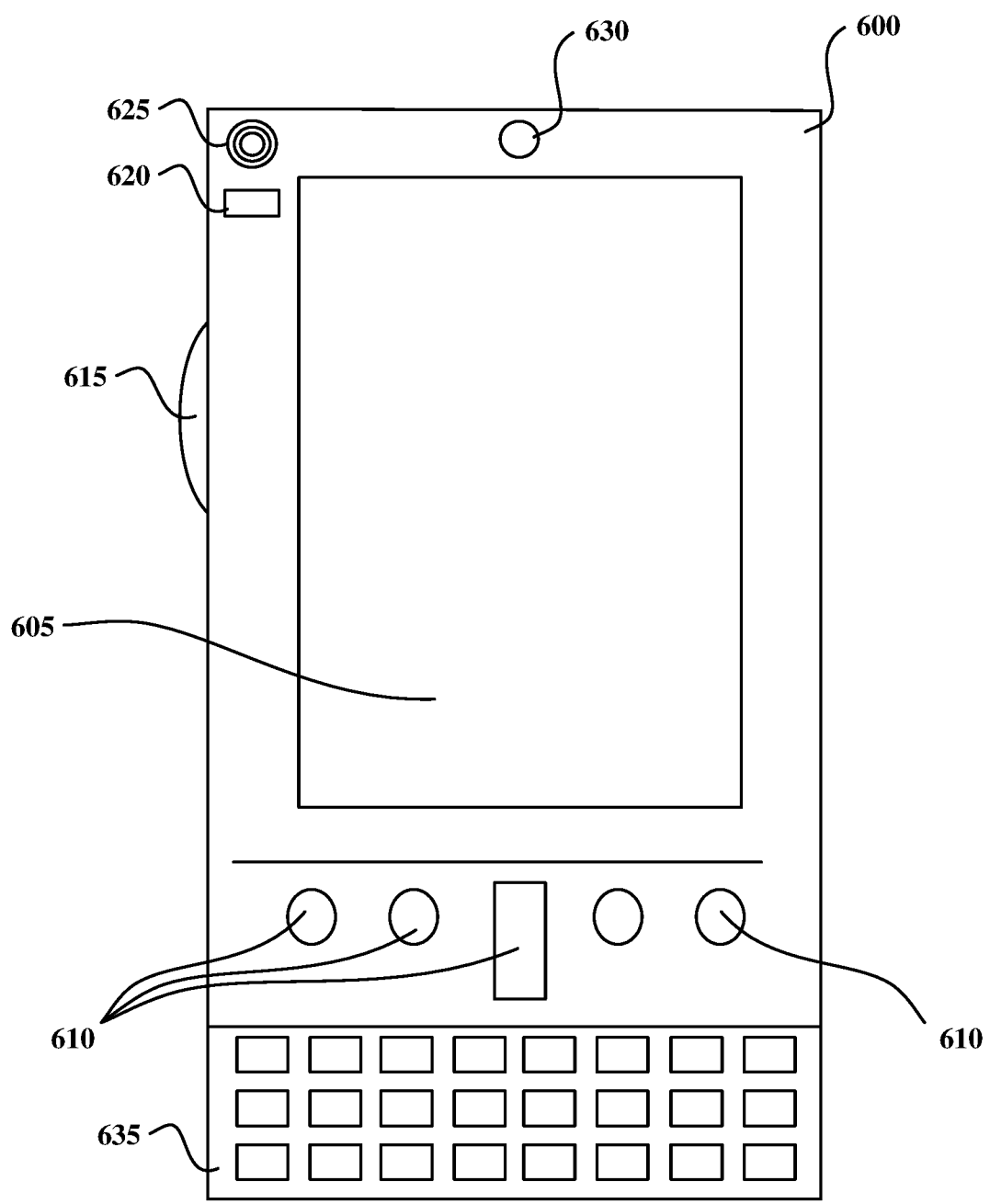
FIGS. 6 and 7 are simplified diagrams of a mobile computing device with which aspects of the disclosure may be practiced.
Figure 7:
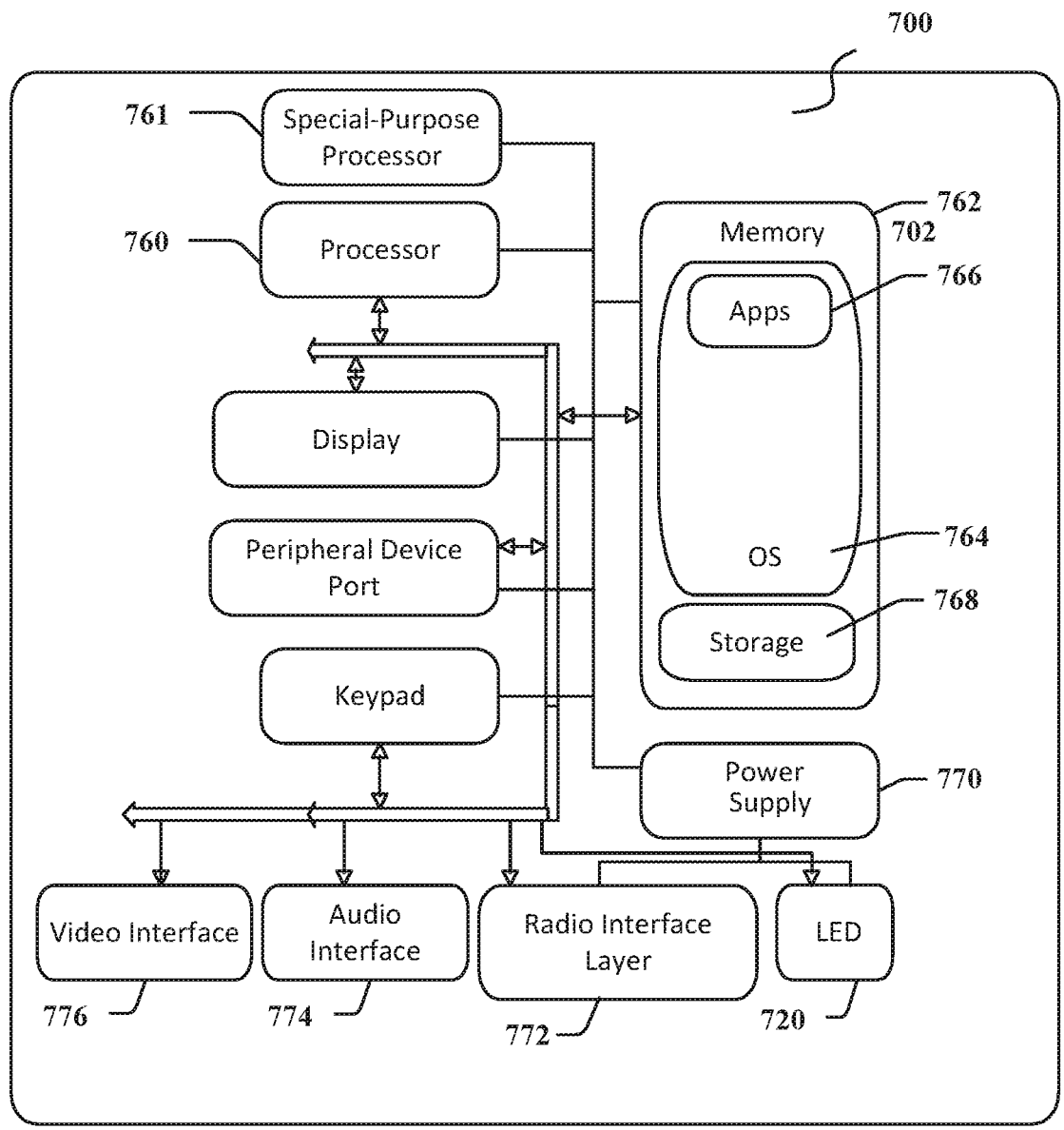

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating an electronic meeting computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
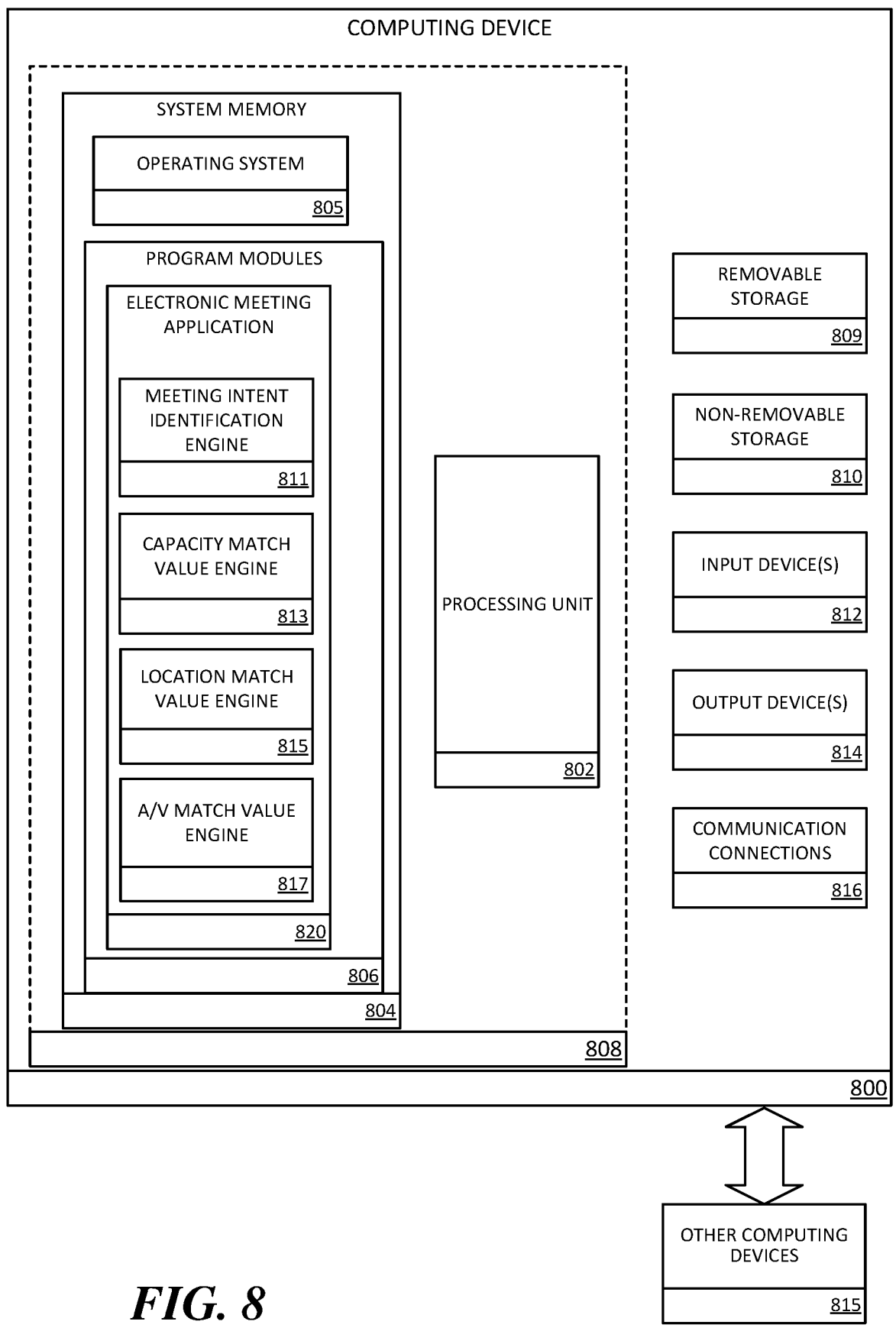
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assigning meeting requests to conference rooms. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more electronic meeting programs and/or electronic calendar service programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., electronic meeting application 820) may perform processes including, but not limited to, the aspects, as described herein. According to examples, meeting intent identification engine 811 may perform one or more operations associated with receiving a natural language input, applying one or more natural language processing models to the natural language input, and identifying a meeting intent associated with the natural language input based on the application of those models. Capacity match value engine 813 may perform one or more operations associated with determining a number of potential attendees for a meeting, determining a capacity for a conference room, and calculating a capacity match value based on those determinations. Location match value engine 815 may perform one or more operations associated with identifying one or more location preferences for a scheduling user, identifying a location associated with a conference room, and calculating a location match value based on those locations. A/V match value engine 817 may perform one or more operations associated with identifying whether a meeting request has an electronic meeting option associated with it, determining whether a conference room has A/V capabilities, and calculating an A/V match value based on those determinations.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
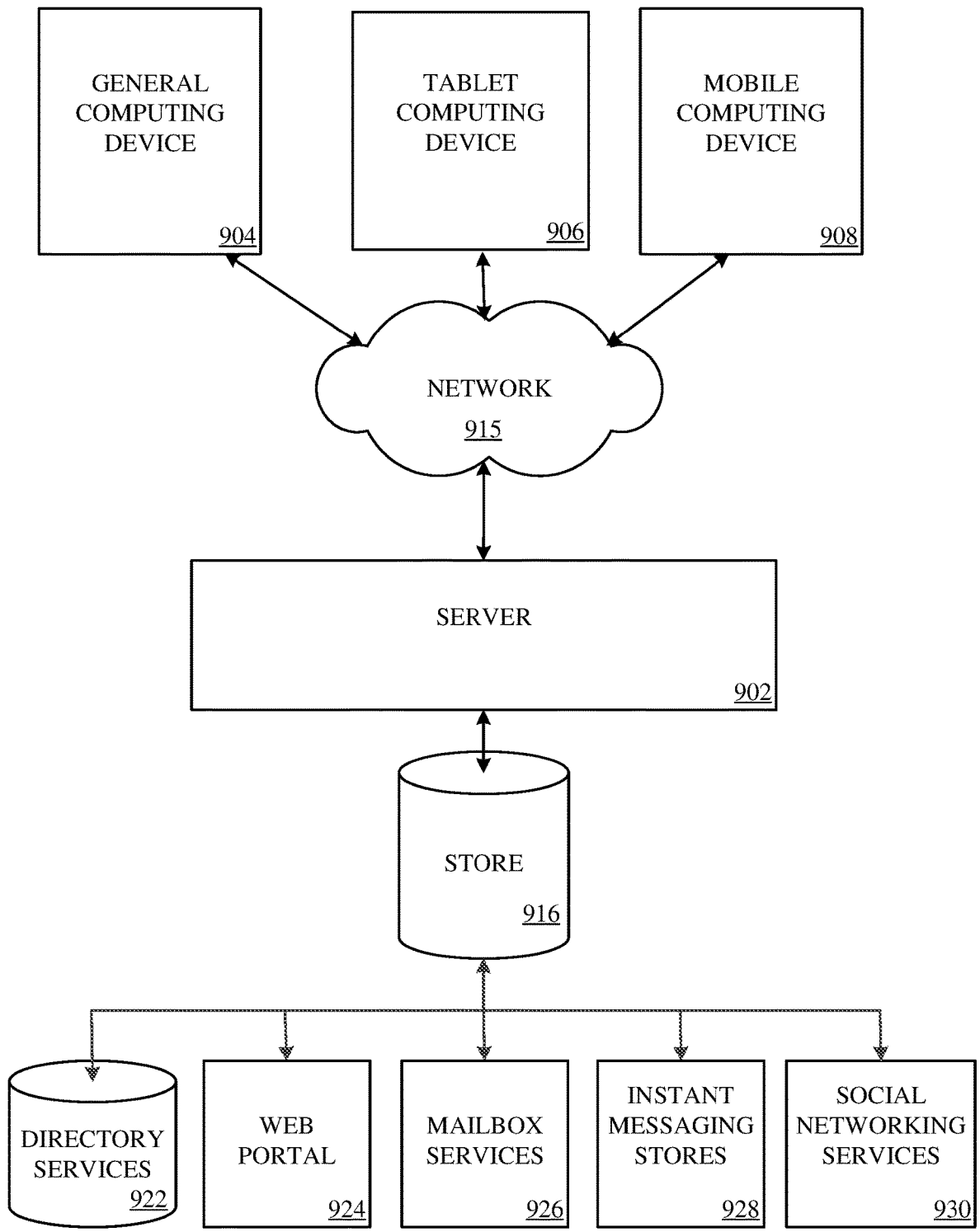
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for assigning conference rooms, the method comprising:
   receiving, by a digital assistant from a first computing device, a first meeting request comprising a natural language input;
   determining, by the digital assistant, based on application of a natural language processing model that has been trained to identify whether there is a meeting intent associated with natural language inputs to the first meeting request, that the first meeting request includes a meeting intent and a meeting date;
   identifying, by the digital assistant, from a user database, a locational preference associated with a user account that sent the first meeting request;
   determining, by the digital assistant, that a location associated with an electronic calendar event that is scheduled for the user account on the meeting date does not correspond to the location preference associated with the user account;
   temporarily modifying the location preference associated with the user account in the user database to the location associated with the electronic calendar event;
   calculating for the first meeting request using the modified location preference associated with the user account, a first meeting fit score for a first conference room;
   reserving, by the digital assistant, the first conference room for the first meeting request;
   identifying for a second meeting request, a second meeting fit score for a second conference room, the second conference room reserved for the second meeting request;
   calculating, for the first meeting request, a third meeting fit score for the second conference room;
   determining that the third meeting fit score is higher than the first meeting fit score;
   determining that the second meeting request can be moved to a third conference room;
   automatically moving, by the digital assistant, the second meeting request to the third conference room; and
   automatically moving, by the digital assistant, the first meeting request to the second conference room.

2. The computer-implemented method of claim 1, further comprising:
   identifying a plurality of event entities associated with the first meeting request, the plurality of event entities comprising: a meeting requestor, and at least one invitee.

3. The computer-implemented method of claim 2, wherein calculating a meeting fit score for a conference room comprises:
   determining a capacity match value between the conference room and a number of potential meeting attendees for a meeting; and
   determining a location match value for a scheduling user that sent a meeting request, the location match value corresponding to a geographic proximity between a location preference of the scheduling user and the conference room.

4. The computer-implemented method of claim 3, wherein calculating the meeting fit score for the conference room further comprises:
   determining audio-visual computing device capabilities for the conference room;
   determining whether the meeting request includes an electronic meeting request; and
   determining an audio-visual match value for the conference room.

5. The computer-implemented method of claim 1, further comprising:
   determining that additional invitees have been added to the first meeting request;
   recalculating the third meeting fit score;
   determining that the recalculated meeting fit score for the third meeting fit score is lower than the third meeting fit score; and
   moving the first meeting request to a conference room for which there is a higher meeting fit score than the recalculated meeting fit score for the third meeting fit score.

6. The computer-implemented method of claim 1, wherein determining that the second meeting request can be moved to the third conference room further comprises:
   determining that a meeting fit score for the second meeting request and the third conference room is within a threshold value of the second meeting fit score.

7. The computer-implemented method of claim 6, wherein determining that the second meeting request can be moved to the third conference room further comprises:
   causing a selectable option to move the meeting corresponding to the second meeting request to be surfaced; and
   receiving an indication, via the selectable option, to move the meeting corresponding to the second meeting request.

8. The computer-implemented method of claim 7, wherein the selectable option is caused to be surfaced on a display associated with a user account of a meeting organizer of the second meeting request.

9. The computer-implemented method of claim 1, wherein the first meeting request comprises an implicit meeting request sent to the digital assistant based on the digital assistant being included in one of: a "to" field of an email, a "cc" field of the email, and a body of the email.

10. The computer-implemented method of claim 9, further comprising:
- extracting, by the digital assistant, a meeting organizer identity from the email; and
- extracting, by the digital assistant, one or more meeting invitee identities from the email.

11. A system for assigning conference rooms, comprising:
a memory for storing executable program code; and
one or more processors, functionally coupled to the memory, the one or more processors being responsive to computer-executable instructions contained in the program code and operative to:
- receive, by a digital assistant from a first computing device, a first meeting request comprising a natural language input;
- determine, by the digital assistant, based on application of a natural language processing model that has been trained to identify whether there is a meeting intent associated with natural language inputs to the first meeting request, that the first meeting request includes a meeting intent and a meeting date;
- identify, by the digital assistant, from a user database, a locational preference associated with a user account that sent the first meeting request;
- determine, by the digital assistant, that a location associated with an electronic calendar event that is scheduled for the user account on the meeting date does not correspond to the location preference associated with the user account;
- temporarily modify the location preference associated with the user account to the location associated with the electronic calendar event;
- calculate, for the first meeting request using the modified location preference associated with the user account, a first meeting fit score for a first conference room;
- reserve, by the digital assistant, the first conference room for the first meeting request;
- identify, for a second meeting request, a second meeting fit score for a second conference room, the second conference room reserved for the second meeting request;
- calculate, for the first meeting request, a third meeting fit score for the second conference room;
- determine that the third meeting fit score is higher than the first meeting fit score;
- receive, by the digital assistant, a cancellation of the second meeting request; and
- automatically move, by the digital assistant, the first meeting request to the second conference room.

12. The system of claim 11, wherein the one or more processors are further responsive to the computer-executable instructions contained in the program code and operative to:
- identify a plurality of event entities associated with the first meeting request, the plurality of event entities comprising: a meeting requestor, and at least one invitee.

13. The system of claim 12, wherein in calculating a meeting fit score for a conference room, the one or more processors are further responsive to the computer-executable instructions contained in the program code and operative to:
- determine a capacity match value between each of the plurality of conference rooms and a number of potential meeting attendees for a meeting; and
- determine a location match value for a scheduling user that sent a meeting request.

14. The system of claim 13, wherein the location match value corresponds to a geographic proximity between a location preference of the scheduling user and each of a plurality of conference rooms.

15. The system of claim 11, wherein in calculating a meeting fit score for a conference room and a meeting request, the one or more processors are further responsive to the computer-executable instructions contained in the program code and operative to:
- determine audio-visual computing device capabilities for the conference room;
- determine whether the meeting request includes an electronic meeting request; and
- determine an audio-visual match value for each of the conference room.

16. The system of claim 11, wherein the first meeting request comprises an implicit meeting request sent to the digital assistant based on the digital assistant being included in one of: a "to" field of an email, a "cc" field of the email, and a body of the email.

17. The system of claim 11, wherein the one or more processors are further responsive to the computer-executable instructions contained in the program code and operative to:
- extract, by the digital assistant, a meeting organizer identity from the email; and
- extract, by the digital assistant, one or more meeting invitee identities from the email.

18. A computer-readable storage device comprising executable instructions that, when executed by one or more processors, assists with assigning conference rooms, the computer-readable storage device including instructions executable by the one or more processors for:
- receiving, by a digital assistant from a first computing device, a first meeting request;
- determining, by the digital assistant, based on application of a natural language processing model that has been trained to identify whether there is a meeting intent associated with natural language inputs to the first meeting request, that the first meeting request includes a meeting intent and a meeting date;
- identifying, by the digital assistant, from a user database, a locational preference associated with a user account that sent the first meeting request;
- determining, by the digital assistant, that a location associated with an electronic calendar event that is scheduled for the user account on the meeting date does not correspond to the location preference associated with the user account;
- temporarily modifying the location preference associated with the user account to the location associated with the electronic calendar event;
- calculating, for the first meeting request using the modified location preference associated with the user account, a first meeting fit score for a first conference room;
- reserving, by the digital assistant, the first conference room for the first meeting request;
- identifying, for a second meeting request, a second meeting fit score for a second conference room, the second conference room reserved for the second meeting request;

calculating, for the first meeting request, a third meeting fit score for the second conference room;
determining that the third meeting fit score is higher than the first meeting fit score;
determining that the second meeting request can be moved to a third conference room;
automatically moving, by the digital assistant, the second meeting request to the third conference room; and
automatically moving, by the digital assistant, the first meeting request to the second conference room.

19. The computer-readable storage device of claim 18, wherein in determining that the second meeting request can be moved to the third conference room, the instructions are further executable by the one or more processors for:
determining that a meeting fit score for the second meeting request and the third conference room is within a threshold value of the second meeting fit score.

20. The computer-readable storage device of claim 18, wherein the first meeting request comprises an implicit meeting request sent to the digital assistant based on the digital assistant being included in one of: a "to" field of an email, a "cc" field of the email, and a body of the email.

* * * * *